Figure 1A:
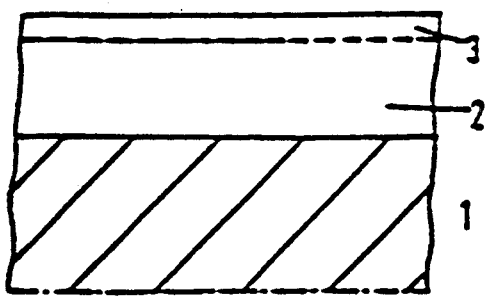

United States Patent [19]

Diemeer

[11] Patent Number: 5,140,652
[45] Date of Patent: Aug. 18, 1992

[54] ELECTRO-OPTICAL COMPONENT AND METHOD FOR MAKING THE SAME

[75] Inventor: Martinus B. J. Diemeer, Zoetermeer, Netherlands

[73] Assignee: Koninklijke PTT Netherland N.V., Groningen, Netherlands

[21] Appl. No.: 683,451

[22] Filed: Apr. 10, 1991

Related U.S. Application Data

[62] Division of Ser. No. 354,741, May 22, 1989, Pat. No. 5,016,959.

[30] Foreign Application Priority Data

May 30, 1988 [NL] Netherlands ............ 8801377

[51] Int. Cl.$^5$ ............ G02B 6/10; H01L 29/161
[52] U.S. Cl. ............................. 385/2; 385/3
[58] Field of Search .................. 385/1, 2, 3, 4

[56] References Cited

U.S. PATENT DOCUMENTS

| | | | |
|---|---|---|---|
| 4,943,133 | 7/1990 | Deri et al. | 385/3 |
| 4,958,898 | 9/1990 | Friedman et al. | 385/3 |
| 4,991,921 | 2/1991 | Suzuki et al. | 385/2 |
| 4,997,246 | 3/1991 | May et al. | 385/2 |
| 5,004,313 | 4/1991 | Tytan et al. | 385/2 |
| 5,028,108 | 7/1991 | Young | 385/2 X |
| 5,034,783 | 7/1991 | Chang et al. | 385/2 X |
| 5,067,828 | 11/1991 | Sullivan et al. | 385/3 |

*Primary Examiner*—Akm E. Ullah
*Attorney, Agent, or Firm*—Frishauf, Holtz, Goodman & Woodward

[57] ABSTRACT

Electro-optical components and semi-manufactured articles, and method for making them. A light conducting layer is formed from a poleable or poled glassy polymer material, which has an under ionizing radiation definitively destructible e/o activity. A selective irradiation under a parallel beam will give sharp transitions (C, D) from an e/o active area (2.1) or an area which can still be activated to an e/o nonactive area. The buffer layers (3 and 5) can also consist of such like irradiated material. A suitable positioning of the electrodes (4 and 11) between which by means of a difference in voltage applied across the connections (12 and 13) an electric field with a sufficient intensity and/or uniformity can be induced extending into the border area, on both sides of the transition planes (C, D), will make sharp inducible refractive index transitions possible. This is utilized with e/o inducible waveguides in thin layers to obtain sharp lateral definitions, and in an optical intermediate switch.

3 Claims, 2 Drawing Sheets

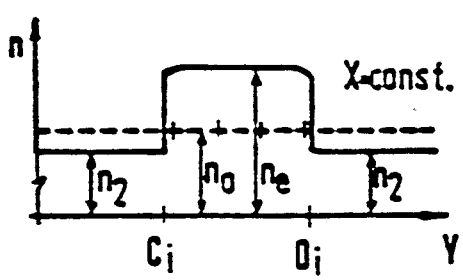
FIG.5a
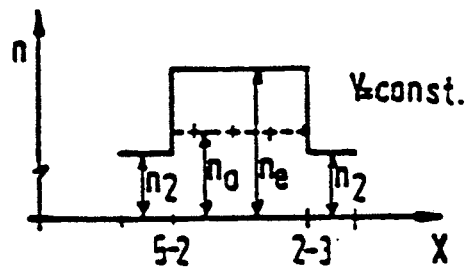
FIG.5b
FIG.6
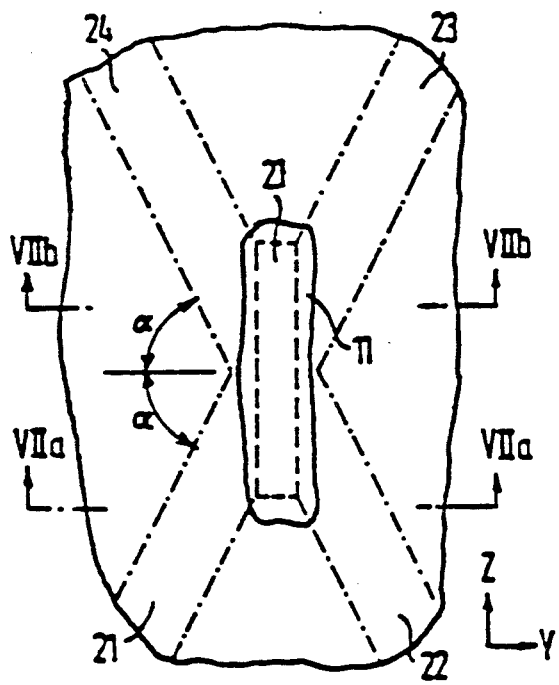
FIG.8
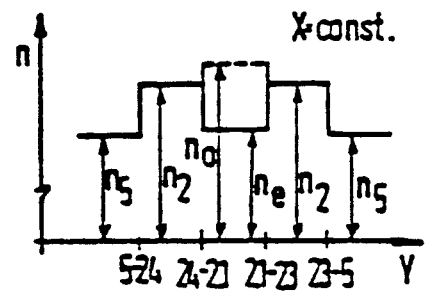
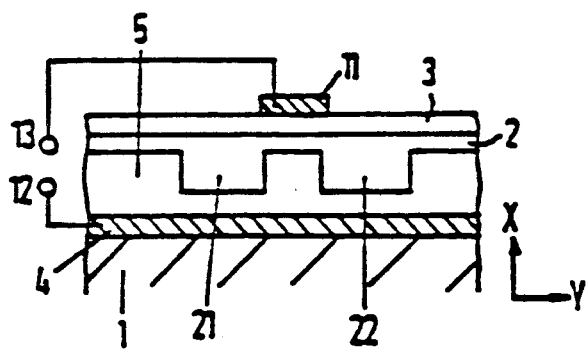
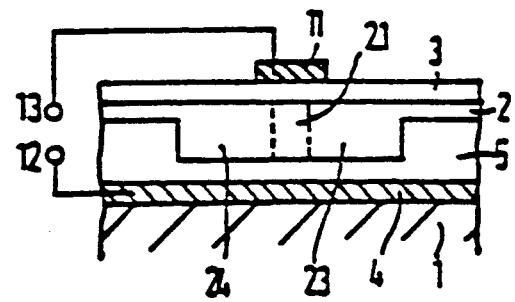
FIG.7a  FIG.7b

ELECTRO-OPTICAL COMPONENT AND METHOD FOR MAKING THE SAME

This application is a divisional of application Ser. No. 07/354,741 filed on May 22, 1989, now U.S. Pat. No. 5,016,959.

A. Background of the invention

1. Field of the invention

The present invention relates to the conduction of light in thin layers, and more in particular to components with suchlike layers comprising a medium with electro-optical (e/o) properties with which under the influence of an electric field changes in the refractive index are induced in the medium in such a way that as a consequence of that the conduction of light in the thin layers will be influenced.

Moreover the present invention comprises a method for making components of the above-mentioned type.

The invention is especially applied in the field of integrated optical techniques.

2. State of the art

Components of the aforesaid type are known per se, for example from the references (1), (2), (3) and (4) mentioned under D. They comprise a substantially plane light conducting layer of electro-optically active material, and are moreover provided with at least two cooperating electrodes disposed on one side or on both sides on said layer in patterns preselected, and possibly kept separated from the electro-optically active layer by light insulating or buffer material—which is not electro-optically active and with a refractive index which is equal to or lower than the electro-optically active material in a non-activated state. Owing to a difference in voltage applied an electric field will be generated between said electrodes, which field will, as long as it exists, cause in the electro-optical material a spatial refractive index profile or a change in it dependent on the direction and the extent of uniformity of the electric field induced between these electrodes, and on the direction of the optical axis of the material. Because of the fact that the working of the electric field induces in the e/o material a spatial refractive index profile, said profile will be strongly dependent on the electrode patterns chosen. Known are straight or bent usually strip-shaped electrodes, of which at least two of them either parallel next to each other, as in (2), or one over the other, as in (1) work together, i.e. across which the required difference in voltage for the desired electric field is applied in the desired direction. Moreover it is known from reference (1) and reference (3) that the strip-shaped electrodes on the one (upper) side of the plane layer of e/o material work together with an electrode extending over the whole plane layer on the other (under) side of said layer.

The spatial refractive index profiles induced by means of electrode patterns of the aforesaid type are usable as light waveguides in the plane light conducting layer, to which a connection of permanent light waveguides such as for example glass fibres is feasible. As to their nature these electro-optically inducible light waveguides can be switched on and off. The refractive index profiles for the desired light waveguide patterns obtained by the electrode patterns known from the cited literature have a somewhat tube-shaped character with often more or less elliptical cross sections. A cross-sectional view shows that a change in the refractive index is greatest in the centre area and away from it decreasing, either gradually to the level of the refractive index of the e/o material, on which the inducing electric field has no or hardly any influence as yet, or at a leap to the level of the refractive index of the contiguous non-e/o buffer material.

The light retaining quality of the induced light conductor, particularly with regard to losses of light energy is dependent on the quality of the lateral definition, with which is indicated the degree of steepness of the decrease, or the leap in the course of the refractive index, towards the level of the refractive index of the surrounding material seen in cross section from the centre area of the light conductor. The lateral definition is determined either by the electric field itself or by the bounding surfaces of the e/o material contiguous to the non-e/o material. With regard to this definition the bounding surfaces at the top and at the bottom will usually not cause any difficulties, certainly not in the case of thin layers with thicknesses to 10 $\mu$m. The electric fields obtained by means of co-operating electrode patterns on both sides of a plane layer of e/o material of a thickness of said order of magnitude are immediately, on both sides of said bounding surfaces, such that a sufficiently great refractive index leap will be induced. The lateral definition on both sides of the induced light waveguide in the plane layer itself will, however, be determined exclusively by the course of the electric field strength and its decreasing uniformity. In that case the decrease of the strength of the field away from the centre area of the light conductor will always have a certain graduality and this does not make it possible to achieve a sharp refractive index transition. A better lateral bounding can be obtained by laterally bounding the e/o material with light insulating material. This is aimed at in the above-cited technique, such as disclosed in references (2) and (3), by placing an extra elongated ridge of e/o material integrated with the plane layer underneath it, in which case, however, part of the bounding is still determined exclusively by the electric course of the field. Besides similar lateral boundings of the e/o material are obtainable by means of otherwise known photolithographic techniques, in which case the e/o material is applied as a layer after which that part of the material which is not usable for the light conductor(s) is etched away. Apart from the fact that this involves extra complicating processes, the side planes obtained by said etching away still have a considerable amount of wall roughness with regard to the conduction of light.

As a solution to said problem, which is even greater in the outside curve of a bend of a ridge-shaped light conductor, reference (4) proposes to cover etched-sidewall ridge-shaped light conductors with a special upper layer of heat resistant synthetic resin of an accurately determined thickness, with which the optical losses in consequence of wall roughness will be reduced. Apart from the fact that it remains to be seen whether due to the above solution in most cases a sufficient reduction of said losses can be achieved, it will remain laborious to utilize that solution.

Reference (1) further discloses an e/o component in which a light waveguide can be induced as it were between two more or less reflecting vertical parallel "walls" at a short distance from each other in the thin layer of e/o material. These reflecting "walls" can be induced by electric fields generated between two pairs of strip-shaped co-operating electrodes disposed on both sides of the e/o material, which fields can effect a decrease of the refractive index in the e/o material between each of the pairs of electrodes. The e/o area between the "walls" will not or hardly be influenced by the fields, and has then to serve as a light waveguide. The lateral definition of such a waveguide will here be more or less complementary to the one of the above-described cases and consequently even less good from a qualitative point of view.

From reference (3) it is further known that the e/o material in the area where two electrodes disposed on both sides of the plane layer work together is locally poled. This means that the e/o material in that area got its optical orientation when the component was made. This takes place by bringing the poleable glassy polymer, of which the e/o material consists, under the influence of an external electric field, when it is still in a state above the glass softening temperature. The electric field may be generated via said co-operating electrodes. Said optical orientation has subsequently been frozen as it were by cooling it down. Outside said area the material is isotropic and electro-optically inactive, but here too the lateral definition of the light waveguide induced in that area cannot be better than the one determined by either the course of the instantaneous inducing electric field or by the course of the degree of ("frozen") e/o activity in consequence of the field under the inducing influence of which the material is poled; all this depends on the degree to which the instantaneous field corresponds to the field with which has been poled.

Summarizing, it can be stated that, in this known technique in the field of the e/o influencing of the conduction of light in thin layers electro-optically induced refractive index transitions, especially those which serve for a total reflection, as used in the case of the temporary establishment of light waveguides, the lateral definition is substantially determined either by the inducing field or by bounding surfaces contiguous to non-e/o buffer material, which bounding surfaces, obtained e.g. by means of known lithographic techniques, have a relatively great wall roughness. This can in both cases lead to unwanted losses of light energy in the e/o components, in the second case the making of them is moreover extra complicated.

B. SUMMARY OF THE INVENTION

The object of the present invention is to provide not only e/o components for the conduction of light in thin layers in which for the purpose of influencing the conduction of light electro-optically inducible refractive index transitions have been defined more sharply than it would have been possible when applying the known technique, but also a method for making such components. A further object of the present invention is to provide an improvement of the lateral definition of light waveguides electro-optically inducible in thin layers.

The invention is an application of the discovery that the irradiation of a poleable (electro-optically still neutral) or poled (electro-optically active) polymer material, of a sort as known per se from the references D (3) and D (6), by an ionizing radiation will definitively annul the e/o activity, which can be activated or is activated by poling. Sharp shadows will then be obtained by a selective irradiation with a parallel bundle of rays of e/o material covered for example by a mask, that means sharp transitions from an electro-optically active area or an area which can still be activated to an electro-optically inactive area in originally the same material. This offers the possibility of defining, especially in components in which such e/o material is used in thin layers for the conduction of lightwaves in such layers, sharper electro-optically inducible refractive index transitions than known hitherto.

For that purpose an e/o component, which comprises
a mainly plane light conducting layer comprising a certain electro-optically active area, and
at least two at least partly co-operating electrodes disposed against said layer in preselected patterns, between which electrodes an electric field with an effect extending into the electro-optically active area can be generated by applying a difference in voltage between said electrodes,
is, according to the invention, characterized as follows.

The light conducting layer consists of material with an electro-optical activity which is destructible under ionizing radiation. The electro-optically active area of that material is left open beforehand by means of selective irradiation. The electrodes have been positioned with regard to the area left open in such a way that a difference in voltage applied across the electrodes induces a field distribution such that, at least in a border area on either side of the place where the area left open borders on irradiated material, the electric field will show a high degree of intensity and/or uniformity. This means that in said border area a refractive index profile with a sharp leap can be defined by arranging an inducing electric field of a sufficient intensity and/or uniformity at the place where an electro-optically active area changes over to an irradiated electro-optically inactive area. Said leap is caused by the inducing field the refractive index in the electro-optically active area undergoing a change on the one side of the change-over, whereas on the other hand the refractive index in the electro-optically inactive area on the other side of the change-over does not undergo a change.

Because of the fact that irradiated material no longer shows e/o activity, such material can be used as light insulating buffer material between non-irradiated electro-optically active material and electrode material of electrodes directed at the electro-optically active material. For that purpose buffer material, which may be provided for keeping the electrodes separated from the electro-optically active area, preferably belongs to the irradiated part of the plane light conducting layer.

When using the invention for improving the lateral definition of a light waveguide of a sort described in reference D (2) which is electro-optically inducible in a thin layer, an e/o component according to the invention will preferably be such that the electrodes are situated on one side, called the upper side, of the layer, and that the electro-optically active area left open includes an electro-optically inducible light waveguide pattern. The electro-optically active area on the upper side seen in a perpendicular projection on the layer are flanked by a corresponding pattern of co-operating strip-shaped electrodes.

When using the invention for improving the lateral definition of light waveguides which are electro-optically inducible in a thin layer, as they are known from reference D (3), an e/o component according to the invention is preferably such that the electrodes are situated on both sides, on the upper side and on the under side of the light conducting layer, and that the electro-optically active area left open includes an electro-optically inducible light waveguide pattern, the electro-optically active area on the upper side, seen in a perpendicular projection on the layer, being covered by a corresponding pattern of strip-shaped electrodes.

For making e/o components according to the invention it may be preferable that the electro-optically active area left open in the layer has, laterally with regard to that layer, substantially vertical bounding surfaces with the irradiated area, and that as seen from the upper side in a perpendicular projection on the layer, the contours of the electrodes, situated on the upper side of the layer and of the electro-optically active area left open, at least partly coincide. The advantage of this is that in the case of a selective irradiation by means of masks the same or complementary masks can be used for selectively irradiating and for applying electrode patters. If an electrode pattern in itself has been sharply defined, such a pattern itself can also serve as a mask for selective irradiation. Such a freedom of choice of masks enhances the flexibility of the process of making said e/o components.

Sharp electro-optically inducible refractive index transitions are very suited for switching purposes, in which case use is made of the direction influencing effect that refraction or reflection at such transitions has on light signals incident at a certain angle. For that purpose the light conducting layer in a preferred embodiment according to the invention comprises at least one permanent light waveguide connected to the e/o area left open in said border area.

From reference D (5) it is known per se for permanent light waveguides produced by local poling in a neutral poleable light conducting polymer layer to be connected for switching purposes to a working area in which a (totally) reflecting refractive index transition can be induced and removed again. This inducing and removing takes place, however, by unpoling the working area or by poling it again, in which case a local heating up to above the polymer softening temperature is effected for a short time while setting up the poling field or unpoling it. Such an excitation of the refractive index transition is based on a molecular reorientation (Kerr effect) and can consequently be effected much more slowly than the one based on e/o activity exclusively due to electron response (Pockels effect). Moreover, in this case too the sharpness of the refractive index transition is fully determined by the course of the field with which the working area has been poled. As an optical switch an e/o component according to the present invention is preferably such that the light conducting layer includes at least three permanent light waveguides, which are connected to the electrooptically active area left open in said border area, and that the connection of each of the light waveguides to this area takes place at such an angle that for a light signal incident through one of the permanent light waveguides a totally reflecting refractive index transition can be induced, and that when there is or is not a refractive index transition inducing field, one or another of the other permanent light waveguides will receive and further conduct the light signal.

The concept "selective irradiation" also includes the process of subjecting the polymer material to two or more interfering radiation beams, which cause an interference pattern in the material. This can be of advantage for bringing about periodical structures in the polymer material, such as for the sake of electro-optically inducible bars.

The invention further relates to a method for making e/o components as described hereinabove for introducing an electro-optically active area into a plane light conducting thin layer, characterized in that this introducing takes place by leaving open the electro-optically active area in the plane light conducting layer by means of selective ionizing irradiation, preferably performed with U.V. light.

Moreover, it can be preferable that the electro-optically active area left open in the plane light conducting layer is obtained by selective ionizing irradiation by means of a mask which is also used for the electrode pattern to be disposed.

To conclude the invention relates to a semi-manufactured article which can be used with advantage for making the above-described e/o components according to the invention. Such a semi-manufactured article comprises a mainly plane light conducting layer, which is supported on the under side by a substrate and which is provided on the upper side with a light insulating first buffer layer. Such a semi-manufactured article is according to the invention characterized in that the light conducting layer consists of a material with an under ionizing radiation destructible e/o activity, which layer has a first sublayer of said material non-irradiated, and a second sublayer of said material irradiated and forming the first buffer layer.

A semi-manufactured article of the aforesaid type can moreover also comprise a second light insulating buffer layer, which is separated from the light conducting layer by an electrode layer disposed between the light conducting layer and the substrate, the second buffer layer preferably also consisting of the irradiated form of said material. Such semi-manufactured articles have the great advantage that, for making e/o components according to the invention by utilizing the method according to the invention, the necessary processes can always be carried out from above.

Summary of the advantages

The invention offers the possibility to give the e/o area in plane layers any desired pattern with a sharp lateral definition, on which the lateral spread of an E-field inducing it will have no influence. The electrode width will no longer be critical for the lateral definition.

The manufacturing process for establishing e/o areas in thin layers is considerably simplified.

Even light-insulating buffer layers can be disposed in a simple way.

C. BRIEF DESCRIPTION OF THE DRAWING

The invention will be further explained with the aid of the drawing, in which

Figure 1B:
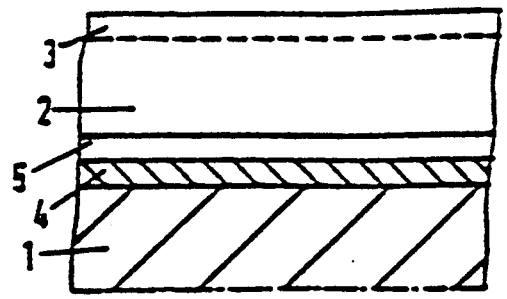
Figure 2A:
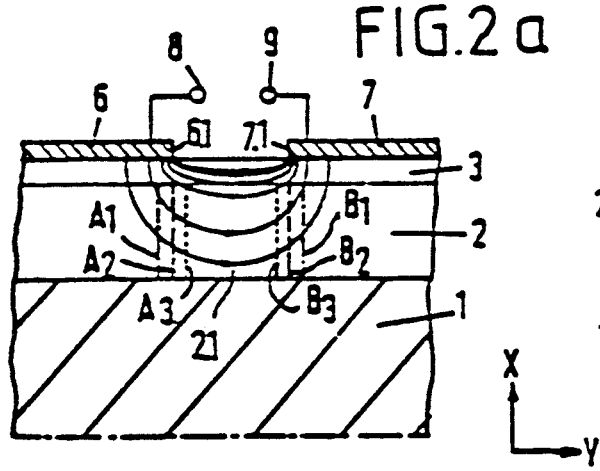
Figure 2B:
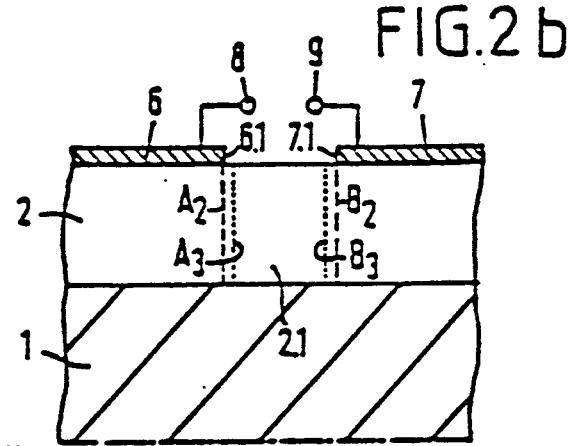
Figure 3A:
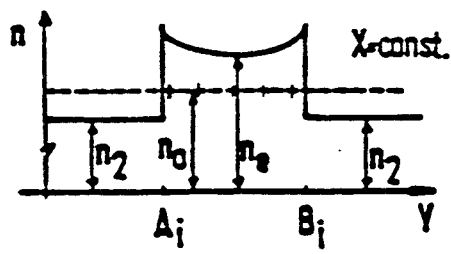
Figure 3B:
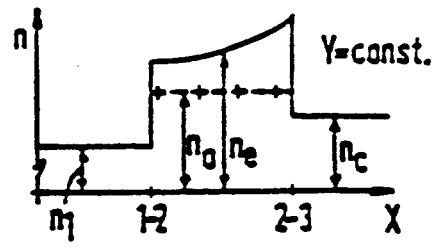
Figure 4:
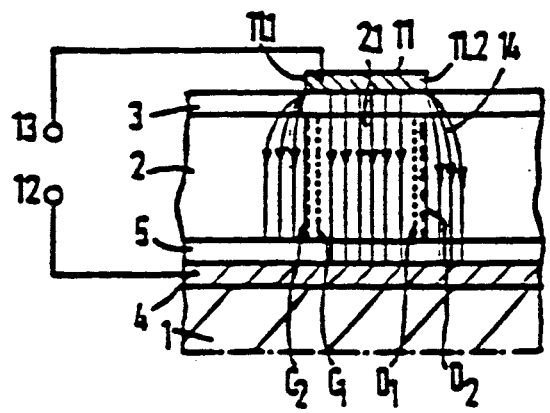

FIGS. 1a and 1b diagrammatically show cross-sectional views of semi-manufactured articles for making e/o components according to the invention, respectively excluding (FIG. 1a) and including (FIG. 1b), FIGS. 2a and 2b diagrammatically show cross-sectional views in an X—Y plane the respective structures of two variants of components with electro-optically inducible light waveguides in which the invention has been applied, FIGS. 3a and 3b show the qualitative courses of the refractive index profiles in two directions represented in FIGS. 2a and 2b by the electro-optically active area of the component respectively in case X=constant (FIG. 3a) and in case Y=constant (FIG. 3b), FIG. 4 diagrammatically shows in a cross-sectional view in the X—Y plane the structure of a component with an electro-optically inducible light waveguide in which the invention has been applied, FIGS. 5a and 5b show the qualitative course of the refractive index profile in two directions represented in FIG. 4 by the electro-optically active area of the component respectively in case X=constant (FIG. 5a) and in case Y=constant (FIG. 5b), FIG. 6 diagrammatically shows a top view (Y-Z plane) of an optical intermediate switch according to the invention, FIGS. 7a and 7b diagrammtically show in a cross-sectional view (X—Y plane) the optical intermediate switch according to FIG. 6 respectively according to the line VII a (FIG. 7) and according to the line VII b (FIG. 7b).

FIG. 8 shows the qualitative course of an associated index profile according to the sectional line VII b.

D. REFERENCES (1) U.S. Pat. No. 3695745 entitled:
Light waveguide circuit;
(2) U.S. Pat. No. 3 801 185 entitled:
Switch for thin-film optics;
(3) EP Patent application No. 0241967 A1 entitled:
Electro-optically induced waveguide, and active devices comprising such a waveguide;
(4) EP Patent application No 0149678 A1 entitled:
Integrated optical circuit;
(5) EP Patent application No. 0318087 of applicant entitled:
Method and device for controlling a beam of light
(6) EP Patent application No. 0290061 entitled:
Linear addition polymer with hyperpolarizable side groups.

E. DESCRIPTION

In the following description of some embodiments to illustrate the invention, it is supposed that an organic polymer of a sort as already known from inter alia references D(3) and D(6) is used as a material for a plane thin light conducting layer. Such a polymer has a skeleton ("backbone") of for example PMMA or polyurethane with e/o sidegroups, which possess dipole moments which can be directed or are "poleable" by means of an external electric field when the polymer is still in its softening state, id est at a temperature still above the glass softening temperature. Under cooling down and maintaining the field this "poling" is retained, so frozen as it were, and gives the material an optical orientation. As a consequence the material is at the same time brought from an undirectional optically isotropic (i.e. neutral) state into a state in which the material is electro-optically active. Such a layer of poleable polymer material can be poled for example in its entirety with an E-field directed perpendicularly to the thin layer. This field is generated between plane electrodes on either side of the thin layer, which has a difference in voltage (pole voltage) across it, which is just below the breakdown voltage of the polymer material. A local poling is also possible with an E-field (not necessarily orthogonally directed at the thin layer) generated between cooperating electrodes with suitably chosen patterns on one side or on both sides of the thin layer. The electro-optically active area thus obtained in the thin layer can, in view of the high e/o coefficient of such material (see reference D (3)), work under a relatively low voltage (even to a factor of 10 lower than the poling voltage) between the electrodes for generating the E-field. As is known, a change in the index of refraction $\Delta n > 0.005$ at 1 V/$\mu$m is possible, so that operating voltages of 5-10 V can be used when the thicknesses of the layer are for example of the order of magnitude of 1-10 $\mu$m. The changes in the index of refraction can be positive as well as negative. In the case of operating voltages with a sign corresponding to the poling voltage it is found that $\Delta n > 0$ and in the case of operating voltages with an opposite sign it is found that $\Delta n < 0$. Now it has appeared by experiment that the irradiation of such a polymer with e/o side groups by ionizing radiation, such as for example U.V.light, definitively destroys these side groups and consequently the e/o effect. This destruction occurs with poled material as well as with unpoled material. Moreover a small change in (decrease of) the index of refraction occurs with regard to that of the material in the neutral state, or in a state in which the material has not been e/o activated by an instantaneously existing electric field. A polymer with a polyurethane skeleton irradiated by U.V. light (by means of a "mask-aligner" KS-MJB 3 HP, 200 W high pressure Hg-lamp) showed:

a change in the refractive index in the order of magnitude $\Delta n = 0.1$;

a penetrating speed of the destucting effect in a plane layer of ca. 1 $\mu$m/h. at 130° C., and of ca. ½ $\mu$m/h. at 20° C., both with a transition zone of about 1 $\mu$m;

the occurence of very sharp shadows, with a resolution of 0.1-0.2 $\mu$m with layer thicknesses to 10 $\mu$m, under selective irradiation by means of masks;

that the polymer remains transparent also for the U.V.light used.

The invention contains the application of light conducting polymer material with the aforesaid kind of effects under ionizing irradiation, viz.

(i) destruction of the e/o activity, and (ii) sharp cast shadows, for obtaining sharp electro-optically inducible refractive index transitions for the purpose of influencing the conduction of light in thin mainly plane layers of suchlike material. All this can be realized by combining a selective irradiation of the e/o material with a suitable choice and position of the means for generating the inducing electric field, in such a way that at least in a border area on both sides of the boundary line between electro-optically active and electro-optically inactive material, which boundary line is obtained due to said selective irradiation, the electric field can show a high degree of uniformity and/or intensity. In this case material inactivated by irradiation can also serve as light insulating buffer material between electrode material and electro-optically active material.

Hereinafter follows the description of three examples in which the invention has been applied, to wit in two of them for the purpose of the lateral definition of electro-optically inducible light waveguides in thin layers, and in one of them for the purpose of an electro-optically inducible light reflector also in a thin layer. Preceding this description follows hereinafter a brief description, with the help of FIG. 1, of the structure of a semimanufactured article from which and with which e/o components according to the invention can be made, and in which semi-manufactured article the invention can already have been applied.

FIG. 1(a) shows a semi-manufactured article consisting of a substrate 1 of for example glass or an Si-wafer with an $SiO_2$ upper layer, with on this substrate 1 a light conducting layer 2 of organic poleable or poled glassy polymer of which the e/o activity can be destroyed under ionizing irradiation, such as U.V. light. The light conducting layer 2 may be provided with a first buffer layer 3 which is transparent for the ionizing irradiation, and which can consist of a layer of for example $SiO_2$ or polystyrene separately applied as said buffer layer, or, as according to the invention, obtained from the irradiation of a light conducting layer of said polymer by U.V. light of a well defined depth of penetration, which light conducting layer originally comprised the layers 2 and 3 of the figure. The advantage of said buffer layer is that for making the semi-manufactured article one step less in the procedure of applying the layers is required. It is generally simpler to carry out irradiation than to apply an extra layer.

FIG. 1(b) represents a semi-manufactured article comprising not only a substrate, a light conducting layer 2 and possibly a first buffer layer 3, as in FIG. 1(a), but moreover a first electrode 4 of for example aluminum or gold, which can be extended immediately on and over the whole surface of the substrate 1, and a second buffer layer 5, which keeps the first electrode 4 separated from the light conducting layer 2. Also the second buffer layer 5 can, just like the first buffer layer 3, consist of either buffer material which differs from the material of the light conducting layer 2 or of irradiated glassy polymer. In the latter case this layer 5 has been provided during the manufacturing process for example in a separate step and has subsequently been entirely irradiated before the light conducting layer, possibly including the layer 3, can follow. Another possibility is to obtain the second buffer layer 5 by irradiation of the light conducting layer 2 from the underside, if both the substrate 1 and the first electrode 4 have been made of a material which is transparent for ionizing radiation.

Semi-manufactured articles according to FIG. 1 are pre-eminently suited for making e/o components according to the invention. The great advantage is that all the processes needed for that purpose can take place from above and on top of the semi-manufactured article without affecting the structure of such a semi-manufactured article. Said processes can also imply the application of the first buffer layer 3 by means of irradiation, which, if necessary, can be postponed till the manufacturing phase 2 of the e/o components, which has the advantage that as a consequence in that phase the thickness of the light conducting layer can be well attuned to the dimensions of for example glass fibres to be connected to that layer.

FIG. 2 diagrammatically shows in an X—Y plane a cross-sectional view of the structure of a component for electro-optically inducible lightwave conduction according to the invention. This structure may be assumed to be made on the basis of a semi-manufactured article according to FIG. 1(a), for which case corresponding layers have been numbered correspondingly. Owing to selective irradiation from above with the aid of a mask, a non-irradiated strip-shaped area 2.1 with vertical bounding surfaces A and B consisting of a polymer which has remained poleable has been left open in the light conducting layer 2. Subsequently the buffer layer 3 has been provided with two strip-shaped electrodes 6 and 7 made of for example aluminum or gold, of which at least the sides 6.1 and 7.1 facing each other run parallel. These strip-shaped electrodes have been positioned in such a way that seen from above they flank the strip-shaped area 2.1, either with some overlapping in the case of a lateral bounding of the area 2.1 by the bounding surfaces $A_1-B_1$ (dash and dot line), or closely contiguous to the lateral bounding by the bounding surfaces $A_2-B_2$ (dashed line) or with a small interspace in the case of a lateral bounding by the bounding surfaces $A_3-B_3$ (dotted line). A pair of bounding surfaces $A_i-B_i$ (i=1, 2 or 3) is preferably situated symmetrically with regard to the plane which is equidistant from and parallel to the sides 6.1 and 7.1 of the electrodes in order to make a suitable division of the inducing electric field over the strip between the pair of bounding surfaces $A_i-B_i$ possible for the sake of a light waveguide to be induced in the area 2.1. An electric voltage causing an electric field which is not uniform in the layers 2 and 3 can be applied across the electrodes 6 and 7 via the connections 8 and 9. Arrows 10 give an impression of the course of the lines of flux of said field. In a component according to FIG. 2a the poling of the area 2.1 of a poleable polymer left open preferably takes place locally with the aid of the electrodes 6 and 7 already disposed, thus after the selective irradiation of the layer 2. The choice of the width of the electrodes 6 and 7 and their situation with regard to the non-irradiated area 2.1, which is now electro-optically active due to poling, depends on the one hand on the thickness of the light conducting layer 2 and the possibly existing buffer layer 3, and on the other hand on the desired dimensions of the waveguide to be induced and possibly still other wave guiding areas to be induced in the layer. An overlapping position of the electrodes 6 and 7 with regard to the electro-optically active area 2.1 (thus near the bounding surfaces $A_1-B_1$) has the advantage that the sides 6.1 and 7.1 of the electrodes need not be sharply determined. Irregularities, if any, in the inducing field resulting from this mainly occur in the buffer layer 3, so without any influence on the refractive index profile of the waveguide to be e/o induced. When the positions of the electrodes 6 and 7 seen from above are so that they show no overlapping with regard to the electro-optically active area 2.1 (i.e. near the bounding surfaces $A_2-B_2$ or $A_3-B_3$), they will have the advantage that the first buffer layer 3 can be dispensed with, whereas nevertheless the electrodes have no direct contact with the electro-optically active area 2.1, which case is shown in FIG. 2(b). An additional advantage is that the e/o area 2.1 better comprises the area with the greatest electric flux density, due to which a better electro-optically inducing effect is guaranteed.

A situation in which the sides 6.1 and 7.1 of the electrodes 6 and 7, respectively are in the same planes as the bounding surfaces $A_2$ and $B_2$ has the advantage that the electrodes 6 and 7 can be disposed with a mask similar or a complementary to the mask (dependent on the disposing or deposition technique used), with which the selective irradiation of the light conducting layer 2 was carried out formerly. If the electrodes 6 and 7 are sharply defined, the selective irradiation can also be carried out after the electrodes 6 and 7 have been disposed, in which case they are used as masks.

An operating voltage with a sign appropriate to the poling and applied to the electrodes 6 and 7 by means of the connections 8 and 9 generates an E-field, which will induce within the bounding surfaces $A_i-B_i$ in the electro-optically active area 2.1 a change in the refractive index over the whole length over which the strip-shaped electrodes 6 and 7 extend, thus causing an electro-optically induced light waveguide with a sharply determined lateral retaining effect (horizontally between the substrate 1 and the first buffer layer 3, or the medium between the electrodes 6 and 7, and vertically through the bounding surfaces $A_i$-$B_i$). FIGS. 3a and 3b show the qualitative course of the associated index profile. FIG. 3a shows the case of X=constant along a line through the light conducting layer 2, and FIG. 3b shows in the case of Y=constant along a line at right angles to the light conducting layer 2 through the e/o area 2.1.

The following designations are given in these figures:

$n_2$=refractive index of the irradiated area of the light conducting layer 2;

$n_0$=refractive index of the e/o area without an inducing E-field;

$n_e$=refractive index of the e/o area with an inducing E-field;

$n_1$=refractive index of the substrate 1;

$n_c$=refractive index of the first buffer layer 3 or another contiguous upper layer between the electrodes 6 and 7;

$A_i$=Y-value of the bounding surface $A_i$, $B_i$=Y-value of the bounding surface $B_i$, 1-2=X-value of the transition between the substrate 1 and the light conducting layer 2;

2-3=X-value of the transition between the light conducting layer 2 and the first buffer layer 3 (or another contiguous upper layer between the electrodes 6 and 7).

The curved course of the profile between $A_i$-$B_i$ in FIG. 3a and between 1-2 and 2-3 is due to the non-uniformity of the inducing E-field. The leaps in the profile indicate the sharp transitions between the electro-optically active area 2.1 and electro-optically inactive material.

FIG. 4 diagrammatically shows in the X—Y plane a cross-sectional view of the structure of a component for the electro-optically inducible conduction of a lightwave, as known from reference D(3) with an improved lateral definition obtained by utilizing the invention. This definition may be assumed to be made on the basis of a semi-manufactured article according to FIG. 1b. In this case too the corresponding layers are numbered correspondingly. Owing to a selective irradiation from above by means of a mask a non-irradiated strip-shaped area 2.1 of a poleable polymer or of a polymer which has remained poled and with vertical bounding surfaces C and D has been left open again in the light conducting layer 2. A strip-shaped electrode 11 with the edges 11.1 and 11.2 has been disposed on the buffer layer 3 in such a position that seen from above at least the area 2.1 will be covered, either with some overlapping in the case of a lateral bounding of the area 2.1 by the bounding surfaces $C_1$-$D_1$, or exactly in the case of a lateral bounding by the bounding surfaces $C_2$-$D_2$.

An electric voltage can be applied across the electrodes 4 and 11 via the connections 12 and 13, which voltage causes in the layers 2, 3 and 5 an electric field which will be uniform or well-nigh uniform in an area between the bounding surfaces $C_1$-$D_1$, and which will gradually fan out more and more outside that area. Arrows 14 give an indication of the course of the lines of flux of this field.

Although poling of the material which forms the light conducting layer 2 can take place all at once by means of a poling voltage between the electrode 4 and a plane-shaped electrode to be temporarily disposed on the buffer layer 3 already prior to the selective irradiation, it can under certain circumstances (if for example electro-optically active areas with an oppositely directed optical orientation are needed at other places in the light conducting layer) also be performed by poling locally after the electrode 11 has been disposed, with making use of the electrode, thus after the selective irradiation of the layer 2. The width of the electrode 11 is at least equal to the width of the electro-optically active area 2.1 left open. A larger width, seen from above in the case of an overlapping of the electro-optically active area 2.1 beyond the bounding surfaces $C_1$-$D_1$, has the advantage that the edges 11.1 and 11.2 of the electrode 11 need not be sharply defined. Irregularities, if any, resulting from this are here also in the inducing field outside the electro-optically active area 2.1 and have consequently no influence on the refractive index profile of the waveguide which has to be electro-optically induced inside that electro-optically active area 2.1. A choice of the width of the electrode 11 equal to the width of the area 2.1, i.e. the edges 11.1 and 11.2 are in line with the bounding surfaces $C_2$ and $D_2$, respectively, here too has the advantage that the electrode 11 can be applied to or disposed on the first buffer layer 3, by means of a mask which is similar or complementary to the mask with which the selective irradiation of the light conducting layer 2 was carried out before to obtain the non-irradiated area 2.1. In the case of a sharply defined electrode 11 the selective irradiation can here too be carried out only after that electrode 11, which then serves as a mask, has been disposed. An operating voltage with a sign corresponding to the poling voltage and applied across the electrodes 4 and 11 via the connections 12 and 13 generates an E-field, which induces within the bounding surfaces $C_i$-$D_i$ (i=1 or 2) in the electro-optically active area 2.1 a change in the refractive index over the whole length over which the strip-shaped electrode 11 extends over the electro-optically active area 2.1, due to which an electro-optically induced light waveguide will arise with a very sharply determined lateral confinement (horizontally between the two buffer layers 3 and 5, and vertically between the bounding surfaces $C_i$-$D_i$).

FIGS. 5a and 5b show the qualitative course of a refractive index profile of an electro-optically induced light waveguide with a structure as represented in FIG. 4. FIG. 5a shows the case of X=constant along a line through the light conducting layer 2 and FIG. 5b shows the case of Y=constant along a line at right angles to the light conducting layer 2 through the e/o area 2.1.

The following designations are given in these figures:

$n_2$=refractive index of the irradiated area of the light conducting layer 2;

$n_0$=refractive index of the e/o area without an inducing E-field;

$n_e$=refractive index of the e/o area with an inducing E-field;

$C_i$=Y-value of the bounding surface $C_i$;

$D_i$=Y-value of the bounding surface $D_i$;

2-3=X-value of the transition between the layer 2 and the first buffer layer;

5-2=X-value of the transition between the second buffer layer 5 and the layer 2.

What is striking in these figures is the (practically) absolute right-angled character of the index profile both in the horizontal and in the vertical direction. Consequently, such "right-angled" electro-optically inducible light waveguides with a very accurate lateral definition can be realized in a very simple way by utilizing the invention.

For electro-optically inducible light waveguides according to FIGS. 2 and 4 it generally applies that when the inducing E-field is removed, the refractive index in the electro-optically active area 2.1 will drop to the $n_0$ level of the non-irradiated polymer. This means that by utilizing the invention "subthreshold waveguides" as known with their advantages from reference D(3), will as a matter of course arise in components for electro-optically inducible waveguides.

To conclude, an e/o component adapted to an optical intermediate switch and based on a sharp electro-optically inducible light reflecting refractive index transition, obtained by applying the invention, will be described as an embodiment with the help of the FIGS. 6 and 7. FIG. 6 shows a top view of this embodiment in a Y—Z plane, FIGS. 7a and b show sectional views in X'Y planes according to the lines VII a and VII b, respectively as indicated in FIG. 6. Said component again consists of a number of layers comparable to those of the component according to FIG. 4, and numbered accordingly. The second buffer layer 5, however, is here thicker. During the manufacturing process a substantially X-shaped pattern as indicated by a dot and dash line in FIG. 6 has been etched out in said layer 5 with a depth somewhat smaller than the thickness of the layer 5 and with for example a right-angled cross section. The layer 2 of the glassy poleable material with an e/o activity which is destructible under an ionizing radiation has been applied to said layer 5. At the same time said material entirely fills up the etched-out X-shaped pattern. Said layer 2 has been integrally irradiated with the exception of the electro-optically active area 2.1, which has a substantially right-angled section in front view as well as in top view (see the dashed line in FIG. 6 as well as in FIG. 7b, and which divides the X-shaped pattern in two.

The material of the first and the second buffer layers 3 and 5 has a refractive index which is lower than that of the irradiated material of the light conducting layer 2. In this way permanent light waveguides 21, 22, 23 and 24 of the "inverted ridge"-type have been formed in the X-shaped pattern, which light waveguides are connected to the area 2.1 at an angle $\alpha$, so that the light waveguides 23 and 24 are in line with the light waveguides 21 and 22, respectively. On the first buffer layer 3 the electrode 11 seen from above covers the area 2.1, which has been made electro-optically active for example by a local poling by means of a poling voltage applied across the electrodes 5 and 11 via the connections 12 and 13. By applying across the electrodes an operating voltage of a sufficient height and with a negative sign with regard to the poling voltage, a refractive index decrease is induced in the area 2.1 in such a way that that refractive index will become about equal to that of the second buffer layer 5. The angle $\alpha$ has been chosen in such a way that the induced refractive index reduction will produce a totally reflecting refractive index transition for each light signal incident via one of the permanent light waveguides 21-24. If there is no inducing E-field, an incident light signal will find a thin plane-parallel layer with a small positive refractive index leap, due to which the signal will experience a small shift with regard to the direction of incidence. Although at the same time some reflection will occur, the signal will be able to propagate practically unweakened in that permanent light guide which is in line with the light guide along which the light signal has entered.

FIG. 8 shows the qualitative course of an associated index profile according to the sectional line VII b.

The following designations are given in this figure:

$n_2$ = refractive index of the irradiated area of the layer 2;
$n_0$ = refractive index of the e/o area 2.1 without an E-field;
$n_e$ = refractive index of the e/o area 2.1 with an inducing E-field;
$n_5$ = refractive index of the second buffer layer 5;
5–24 = Y-value of the transition from the layer 5 to the guide 24;
24–2.1 = Y-value of the transition from the guide 24 to the area 2.1;
2.1–23 = Y-value of the transition from the area 2.1 to the guide 23;
23–5 = Y-value of the transition from the guide 23 to the layer 5.

Although only three embodiments have been described in detail in what precedes, the application of the invention is not restricted to those embodiments. Wherever in integrated optical components electro-optically inducible refractive index transitions are desired, the invention can be utilized with great advantage. This applies also to periodic structures, such as gratings as used inter alia in electro-optical grating reflectors or deflectors. It is known to excite such gratings in thin layers of e/o material by means of periodic electrode structures. The quality of such gratings is strongly dependent on the quality (sharpness) of the electrodes. When in the case of one-sidedly disposed electrodes, so-called "interleaved" electrodes are used, there is moreover the risk of short-circuiting. By utilizing the invention the grating structure can be established directly in the light conducting layer by means of a selective irradiation, in which case the whole grating structure can preferably be sandwiched between two plane-shaped electrodes, as a result of which a photolithographic step for applying the periodic electrode structure can be omitted. Moreover an absolute uniformity of the inducing electric field over the whole grating structure is guaranteed, due to which every bar of that grating structure can be produced in an extremely sharp way.

I claim:

1. A semi-manufactured article for making an electro-optical component comprising a substrate, a substantially plane light-conducting layer, and at least one light-insulating buffer layer, said light-conducting layer and said light-insulating layer being supported by said substrate, characterized in that said light-conducting layer consists of a material having a potentially electro-optical activity which is destructible under exciting radiation, which light-conducting layer includes a first sublayer of said material which is non-irradiated, and a second sublayer of said material which is irradiated and forms said at least one buffer layer.

2. The semi-manufactured article of claim 1 characterized in that said substrate supports said light-conducting layer on a first surface of said first sublayer and that said second sublayer is provided on a second surface, opposite to said first surface of said first sublayer.

3. The semi-manufactured article of claim 1 characterized in that said article further comprises a second buffer layer for keeping an electrode layer applied to said substrate separated from said light-conducting layer, and that said light-conducting layer includes a third sublayer of said material which is irradiated and forms said second buffer layer, said first sublayer being in-between said second and third sublayers.

* * * * *

UNITED STATES PATENT AND TRADEMARK OFFICE
CERTIFICATE OF CORRECTION

PATENT NO. : 5,140,652

DATED : August 18, 1992  Page 1 of 2

INVENTOR(S) : DIEMEER, Martinus B.J.

It is certified that error appears in the above-identified patent and that said Letters Patent is hereby corrected as shown below:

Column 3, line 61, change "ionizing" to --exciting--.

Column 4, line 18, change "ionizing" to --exciting--.

Column 6, line 5, change "ionizing" to --exciting--.

Column 6, line 9, change "ionizing" to --exciting--.

Column 6, line 23, change "ionizing" to --exciting--.

Column 7, line 53, after the word "active", insert the following:

--Prior to poling, therefore, the material has only a potentiality for electro-optical activity.--

Column 8, line 15, before the word "Moreover", insert the following:

--The step of irradiation may therefore be performed either before or after poling.--

Column 8, line 37, change "ionizing" to --exciting--.

Column 9, line 4, change "ionizing" to --exciting--.

Column 9, line 6, change "Ionizing" to --exciting--.

Column 10, line 39, change "e/o" to --electro-optically--.

UNITED STATES PATENT AND TRADEMARK OFFICE
CERTIFICATE OF CORRECTION

PATENT NO. : 5,140,652
DATED : August 18, 1992
INVENTOR(S) : DIEMEER, Martinus B.J.

It is certified that error appears in the above-identified patent and that said Letters Patent is hereby corrected as shown below:

Column 13, line 29, change "ionizing" to --exciting--.

Signed and Sealed this

First Day of March, 1994

Attest:

BRUCE LEHMAN

Attesting Officer     Commissioner of Patents and Trademarks